No. 860,766. PATENTED JULY 23, 1907.
L. R. ROBERTS.
BEARING FOR TYPE BARS OF TYPE WRITERS.
APPLICATION FILED JULY 14, 1906.
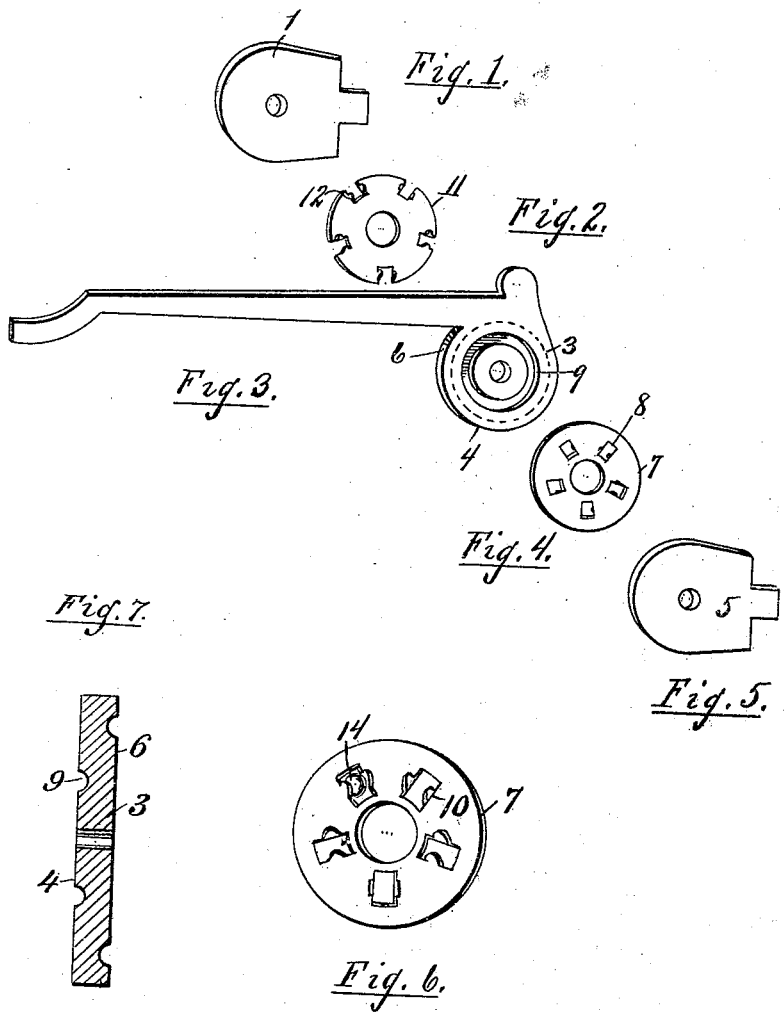
WITNESSES
May E. Kott.
Lotta Lee Hayton.
INVENTOR
Lyman R. Roberts
By Parker & Burton
Attorneys.

UNITED STATES PATENT OFFICE.

LYMAN R. ROBERTS, OF DETROIT, MICHIGAN.

BEARING FOR TYPE-BARS OF TYPE-WRITERS.

No. 860,766.　　　　　Specification of Letters Patent.　　　　Patented July 23, 1907.

Application filed July 14, 1906. Serial No. 326,168.

*To all whom it may concern:*

Be it known that I, LYMAN R. ROBERTS, a citizen of the United States, residing at Detroit, county of Wayne, State of Michigan, have invented a certain new and useful Improvement in Bearings for Type-Bars of Type-Writers; and I declare the following to be a full, clear, and exact description of the same, such as will enable others skilled in the art to which it pertains to make and use the same, reference being had to the accompanying drawings, which form a part of this specification.

This invention relates to bearings for the type bars of typewriters, and has for its object an improved cage or spacer adapted to be interposed between the balls employed to produce an anti-friction bearing.

In the drawings:—the Figures 1, 2, 3, 4 and 5, show the several parts employed to produce the bearing for a single type bar, Fig. 3, showing a type bar, Figs. 1 and 5, the fixed spacers, Figs. 2 and 4, the cages used on the two sides of the type bar. Fig. 6, shows the cage of Fig. 4 on an enlarged scale and in perspective. Fig. 7, is a sectional elevation on an enlarged scale through the bearing-rod hole of the hub, looking lengthwise of the bar.

The fixed spacing plates 1 and 5 are held in place on a rod which is not shown, but which may have any desired curvature in order that the type bars strung thereon may strike to a central point. These fixed spacing pieces have their bearing faces plane but not necessarily parallel; preferably they diverge on radial lines from the center to which the type bearing end of the type bar strikes.

The type bar is provided with a large bearing hub 3 with parallel faces and with a groove in each face, but with the groove in the one face 6 larger in diameter than the groove in the opposite face 4. With the face 4 is used a cage 7 made from very thin sheet metal, through which are punched holes for the reception of the anti-friction balls; and the metal or a part of the metal from the spaces 8 in which the balls 14 engage is turned downward at right angles to the general surface of the cage 7 and is cut in rounded form to engage easily in the groove 9, although the turned down projections 10 are trimmed to clear the surface of the groove. A similar cage 11 is made to confine the balls on the side 6 of the type bar. Inasmuch as the groove on the side 6 is of larger diameter than the groove on the side 4, the holes may become notches, as shown at 11 in Fig. 2. The same provision to provide lugs 12 is made in the cage 11 as in the cage 7. The lugs effectually prevent the balls 14 from crowding under the disk as they might do were the lugs omitted.

What I claim is:—

1. In a bearing for type bars, in combination with a fixed bearing, a type bar having a hub portion through which said fixed bearing passes, said portion having on each face a groove concentric with the axis of said fixed bearing, one of said grooves being at a greater distance from said axis than the other, bearing balls adapted to engage in each of said grooves, and a cage of thin metal provided with openings complementary in number to the series of balls which it is adapted to engage, there being on the sides of each opening lugs adapted to engage in the groove at each side of each ball, substantially as described.

2. A bearing for type bars, having in combination with a fixed bearing, a type bar provided with a hub portion mounted upon said bearing, the opposite faces of said hub portion having concentric grooves of different diameters, a set of bearing balls engaging in each groove, and spacer members adapted to engage said balls and separate the same from those appurtenant to the adjacent type bar, and to space the individual balls from one another, said spacer consisting of a thin metal disk with openings therethrough for the balls and with lugs depending from each side of each opening into the groove, substantially as described.

In testimony whereof, I sign this specification in the presence of two witnesses.

LYMAN R. ROBERTS.

Witnesses:
CHARLES F. BURTON,
LOTTA LEE HAYTON.